United States Patent [19]

Haan et al.

[11] Patent Number: 5,377,949

[45] Date of Patent: Jan. 3, 1995

[54] BREAKAWAY ACCESSORY MOUNTING FOR VEHICLES

[75] Inventors: Theodore M. Haan, Byron Center; Edward R. Adams, Spring Lake; Wayne Vandenbrink, West Olive, all of Mich.

[73] Assignee: Donnelly Corporation, Holland, Mich.

[21] Appl. No.: 22,968

[22] Filed: Feb. 25, 1993

[51] Int. Cl.⁶ .......................................... F16M 13/00
[52] U.S. Cl. ................... 248/549; 248/483; 248/900
[58] Field of Search ............ 248/549, 548, 900, 475.1, 248/481, 483, 484, 478, 544, 221.3, 221.4, 222.1, 223.3, 223.4, 224.1, 224.2, 231.3; 359/872

[56] References Cited

U.S. PATENT DOCUMENTS

| 614,503 | 11/1898 | Sackett | 248/221.3 X |
|---|---|---|---|
| 1,915,230 | 6/1933 | Hooper | 248/221.3 |
| 3,048,084 | 8/1962 | Iannuzzi | 248/475 X |
| 3,160,280 | 12/1964 | Burch . | |
| 3,451,319 | 6/1969 | Gubela . | |
| 3,512,746 | 5/1970 | Vitaloni et al. . | |
| 4,254,931 | 3/1981 | Aikens et al. . | |
| 4,346,868 | 8/1982 | Linder . | |
| 4,626,086 | 12/1986 | Ohyama . | |
| 4,626,087 | 12/1986 | Ohyama . | |
| 4,936,533 | 6/1990 | Adams et al. . | |
| 4,948,085 | 8/1990 | Mitthlhauser . | |
| 4,984,882 | 1/1991 | Boyd . | |
| 5,058,851 | 10/1992 | Lawlor et al. . | |
| 5,100,095 | 3/1992 | Haan et al. . | |

FOREIGN PATENT DOCUMENTS

| 2354551 | 5/1975 | Germany . |
|---|---|---|
| 2539681 | 3/1977 | Germany . |
| 125972 | 8/1979 | Germany . |
| 59-164243 | 9/1984 | Japan . |
| 949033 | 2/1964 | United Kingdom . |
| 2046687 | 11/1980 | United Kingdom . |

OTHER PUBLICATIONS

Photographs of rearview mirror mounting structure sold by Gentex Corporation of General Motors Corporation in the United States at least since Jun. 1992.
General Motors Corporation windshield rearview mirror mounting base/button, in public use for more than one year prior to filing of the present application.
U.S. patent application Ser. No. 08/010615, filed Jan. 28, 1993; entitled Breakaway Accessory Mounting for Vehicles, invented by Theodore M. Haan, Wayne Vandenbrink, Steven J. Forbes, and Dennis J. TenBroeke.

Primary Examiner—Ramon O. Ramirez
Assistant Examiner—Korie H. Chan
Attorney, Agent, or Firm—Price, Heneveld, Cooper, DeWitt & Litton

[57] ABSTRACT

A breakaway accessory mounting assembly for supporting rearview mirrors or other accessories on vehicles includes a coupler for installation on a base of the type secured to the inside windshield surface or another vehicle panel. The coupler has a support for mounting the rearview mirror or other accessory and a spring clamp retaining band extending around the coupler, preferably within a corresponding shaped recess, at a position spaced from and independent of the accessory support for releasably holding the coupler on the base until an impact force causes the assembly to release from the base. The spring clamp retaining band includes a pair of converging, inwardly angled, spaced spring flanges which project from the coupler to resiliently engage the base sides and allow both sliding installation and release of the assembly.

36 Claims, 4 Drawing Sheets

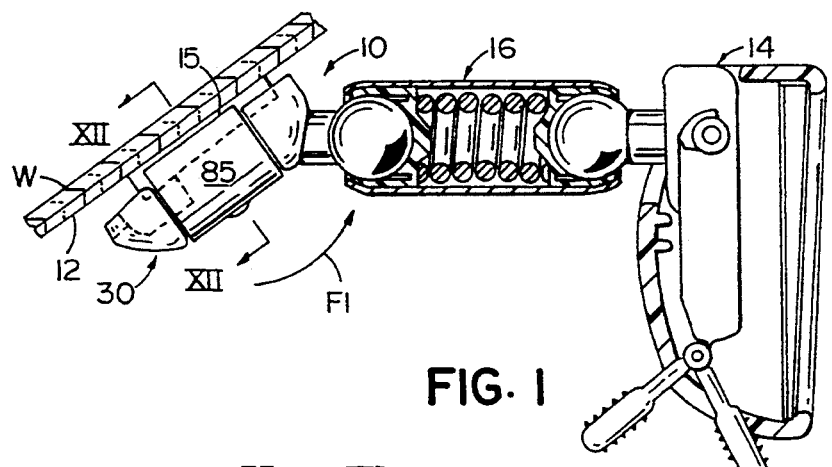
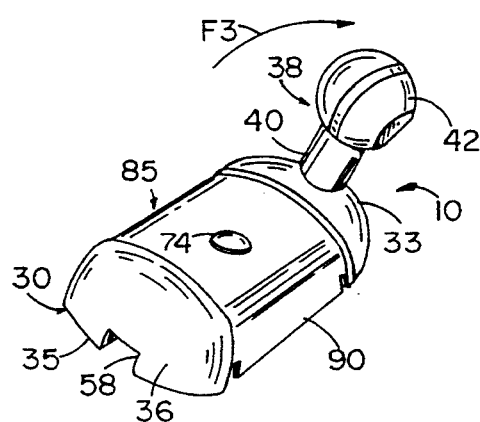
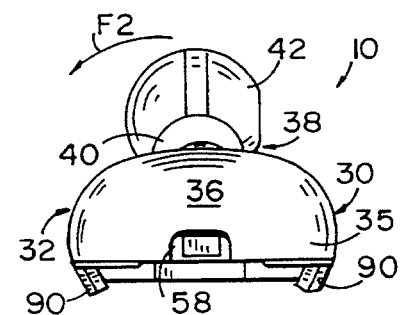
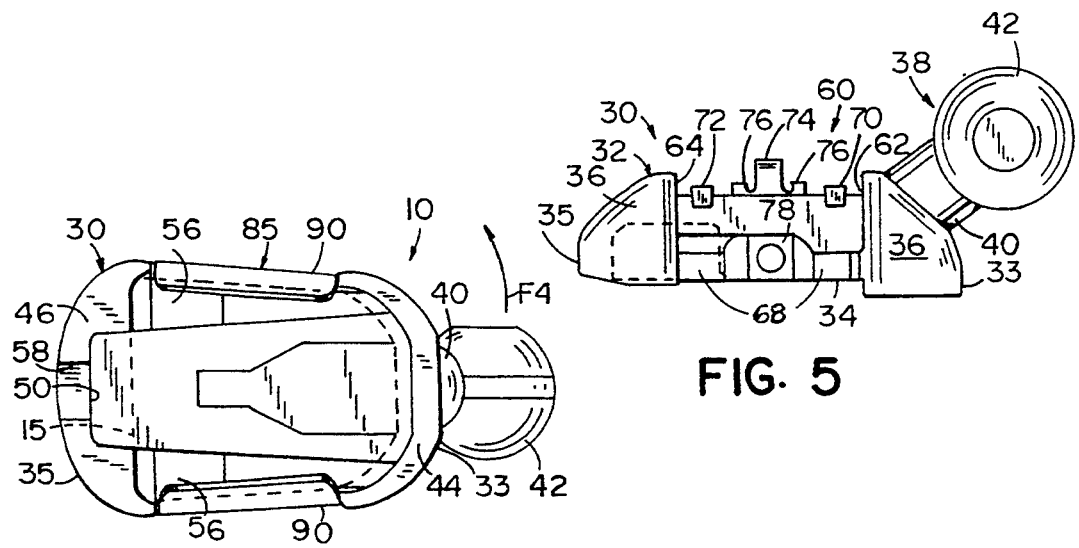
FIG. 1
FIG. 2
FIG. 3
FIG. 4
FIG. 5

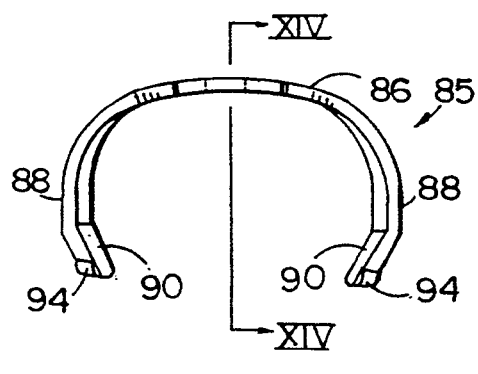
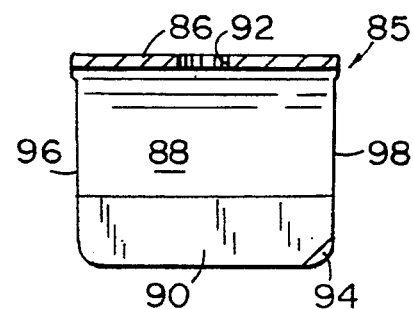
FIG. 13  FIG. 14
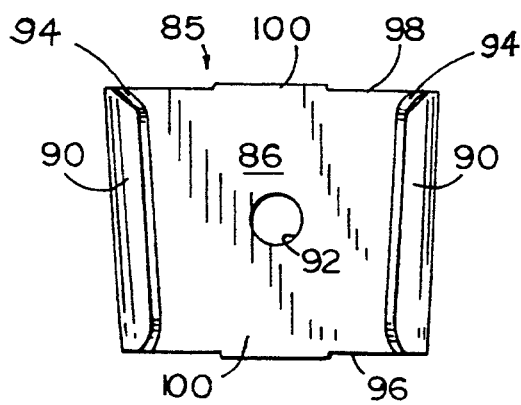
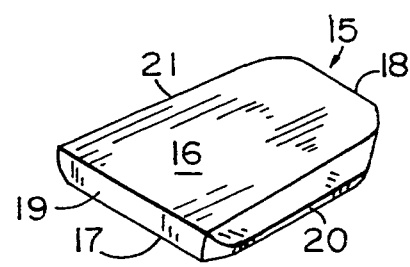
FIG. 15  FIG. 16
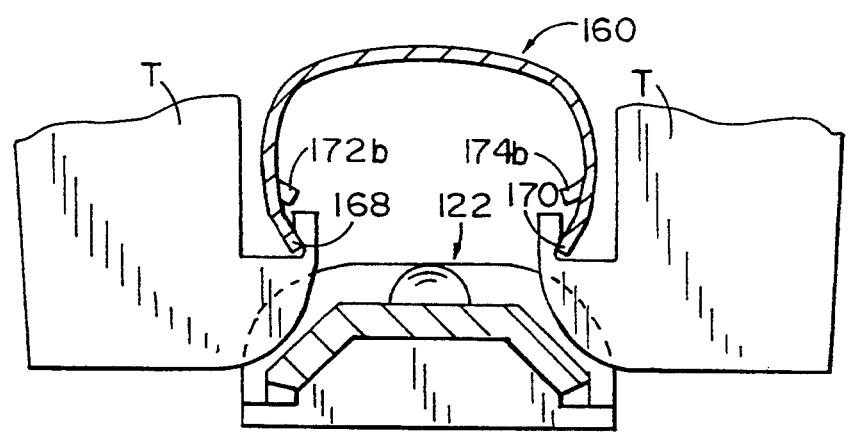
FIG. 21

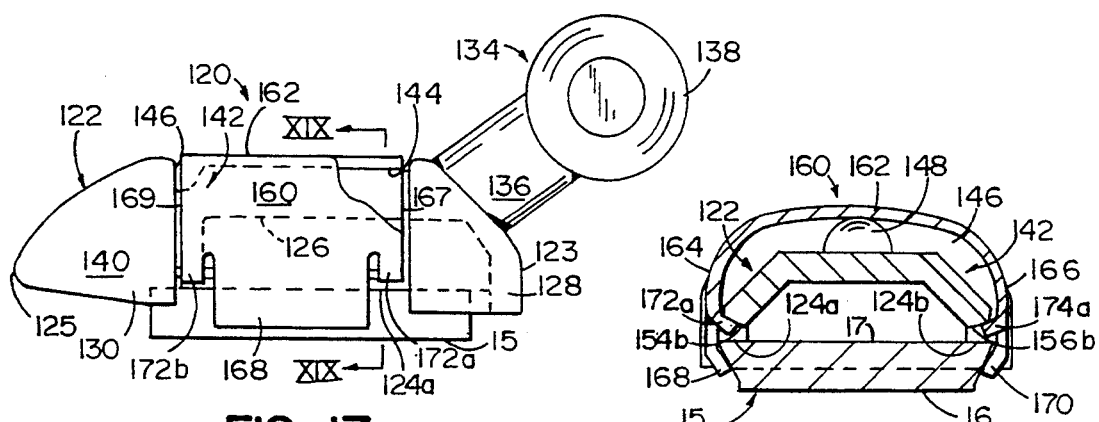
FIG. 17
FIG. 19
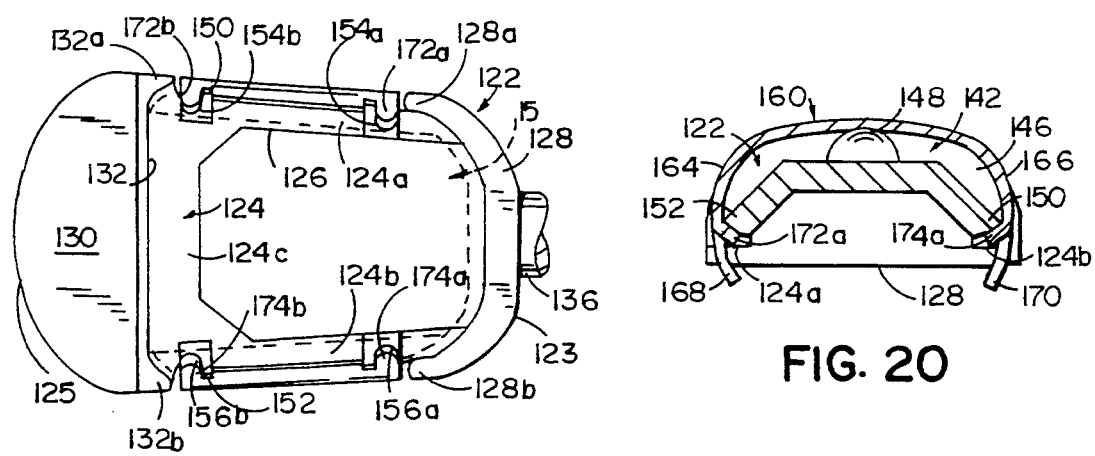
FIG. 18
FIG. 20
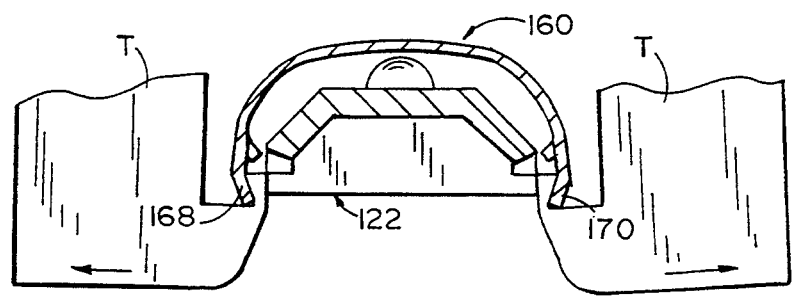
FIG. 22

BREAKAWAY ACCESSORY MOUNTING FOR VEHICLES

BACKGROUND OF THE INVENTION

The present invention relates to releasable mounting systems for vehicle accessories which will release the accessory upon impact to prevent injury and, more particularly, to a breakaway mounting system especially useful with rearview mirrors which is reusable after release and compatible with existing vehicle supports, but is simplified and more reliable than prior known assemblies.

Breakaway rearview mirror mounting systems in which the mirror is released from a supporting structure in the vehicle upon receipt of an impact or during an accident are well known. Many countries of the world require the use of such breakaway assemblies to meet minimum vehicle standards. However, prior known breakaway systems have often provided inconsistent installation and/or release forces even though manufactured to the same tolerances. When such systems are installed on vehicles, some will release at higher loads than others and/or require greater installation effort than others thereby creating the possibility of injury to vehicle occupants as well as difficulties in manufacture and/or higher part rejection rates and higher costs.

In addition, many prior known breakaway mirror mounting systems have not been designed for reinstallation after release. In such systems, frangible or other parts useful only one time are included such that the entire assembly must be replaced after an accident, other release due to an impact, or even removal for repair. As a result, the costs for using these systems are significantly higher.

In other systems, performance after reinstallation is substandard. In many prior systems, springs or resilient members included in the system are not caused to "yield" prior to release. Causing a spring to "yield" establishes a predetermined spring force. However, when such "yield" occurs only upon release of the assembly during an accident or the like, the spring force will be less upon reinstallation. Thus, tight, consistent retention of the rearview mirror or other accessory after reinstallation is impossible without resultant vibration and blurring of images in the mirror. Further, in many cases, the assembly must be entirely replaced even though the ability to reinstall and use is intended.

In yet other prior known breakaway systems, the impact directions for which release from the vehicle is allowed has often been limited. For example, some assemblies allow release only when impacted by an object or person within the vehicle moving upwardly and/or toward the windshield and against the assembly upon sudden deceleration. However, the increased use in vehicles of supplemental vehicle occupant restraint systems, known as airbags, has created additional hazards since the release of one or dual airbags for the driver and/or front seat passenger can trap the rearview mirror rearwardly of the airbag when the mirror is mounted in the center of the windshield. Proper release is prevented if the mirror is struck during an accident, while the airbag or bags are inflated. Thus, a need was recognized for breakaway mirror mounting assemblies which can release from multiple directions including that caused by an expanding airbag or bags.

Apart from the above, other problems encountered with previously known breakaway rearview mirror support assemblies have included the use of a large number of related parts which not only increase manufacturing and inventory costs, but also create complex assemblies with greater possible failure modes and which require more time or are more difficult and complex to assemble and install. Moreover, many prior known breakaway assemblies have required the use of tools for installation in a vehicle thereby requiring more highly trained installers and creating additional expense. Further, set screws have been included in some assemblies. These screws can loosen during use and result in unwanted vibration and image blurring. Also, many prior known breakaway assemblies have included less than adequate retention strength in order to allow easier installation thereby compromising stability during use and again creating unwanted vibration and image blurring visible in the supported mirror.

Therefore, a need was apparent for an improved, simplified, breakaway mounting assembly for rearview mirrors and other accessories which overcomes the above problems.

SUMMARY OF THE INVENTION

Accordingly, the present invention provides a breakaway accessory mounting assembly for vehicles which provides release upon impact from any one of multiple directions, provides consistency in installation and release forces, and allows reinstallation with stable, reduced vibration retention after such reinstallation, all while reducing the number of parts and providing easier installation and manufacture as compared to prior known assemblies.

In one form, the invention is a breakaway accessory mounting assembly for vehicles for supporting rearview mirrors or other accessories including a coupler for engaging a base of the type mounted on the surface of a vehicle window or other panel, and a resilient, flexible retaining band extending around the outer coupler body surface. The coupler body includes a support for mounting an accessory, such as a rearview mirror, a first surface for positioning the coupler on the base, and an outer, exterior surface extending away from but generally aligned with the first surface. The retaining band includes a pair of resilient, spaced depending flanges for engaging the base and releasably retaining the coupler and band on the base when the mounting assembly is installed. The retaining band engages the outer coupler body surface at a position spaced from and independent of the accessory support such that, when installed on the base, the assembly will be retained on and be releasable from the base independent of the mounting of any rearview mirror or other accessory on the coupler.

In preferred forms of the invention, the coupler may include walls adjacent the ends of the coupler body adjacent the first surface, the walls being spaced from one another and confining the base therebetween after the assembly is installed. The wall at one end provides a stop which positions the coupler on the base during installation, while the second wall snaps over the opposite end of the base to signal proper installation position. Further, the coupler body may include positioning means for locating and positioning the retaining band or spring clamp on the coupler body and for resisting movement thereon. Preferably, such positioning means includes a recess which allows the retaining band to be mounted flush with the exterior surface of the coupler.

In other aspects of the invention, the coupler body includes one of several types of support surfaces which contact the inside surface of the retaining band and space the band outwardly from other areas of the coupler in order to provide consistent, predetermined loading of the spring clamp band on the coupler. In addition, the coupler body is preferably tapered such that its opposing side surfaces converge toward the end on which the rearview mirror support is located with the depending flanges of the retaining band likewise converging toward that end. In addition, those depending flanges are also inclined toward one another and are especially adapted to mate with the inclined, converging sides of a conventional mounting button of the type secured to the inside surface of a window such as the front windshield of a vehicle.

In yet other aspects of the invention, the retaining band is secured to the coupler by a fastening means in order to hold the parts together during shipping and after release so that the assembly is easier to reinstall.

The present breakaway accessory mounting assembly provides numerous advantages over prior known assemblies. First, the assembly provides stable support for a rearview mirror or other accessory while also allowing consistent detachment at predictable detachment loads under impact from any one of multiple directions. The assembly is compatible with conventional rearview mirror support bases or buttons, and can be reinstalled if released during an accident or otherwise. After reinstallation, the assembly provides consistent, maintainable retention forces without annoying vibration or blurring of images visible in the mirror. In addition, the present invention is especially adapted for use in vehicles incorporating airbags and provides release from multiple directions including that caused by an expanding airbag or bags. Further, the assembly allows installation without the use of tools to reduce labor and manufacturing costs, provides easier, preloaded installation while avoiding all screws or other fasteners which require tightening or can loosen during use, reduces the number of parts needed as compared to prior known assemblies, and is adapted for ease in manufacture.

These and other objects, advantages, purposes and features of the invention will become more apparent from a study of the following description taken in conjunction with the drawings.

BRIEF DESCRIPTION OF THE DRAWINGS

FIG. 1 is a side elevation of a first form of the breakaway mounting assembly illustrating support of a typical rearview mirror from the inside surface of a vehicle windshield;

FIG. 2 is a perspective view of the mounting assembly of FIG. 1;

FIG. 3 is a rear elevation of the mounting assembly of FIGS. 1 and 2;

FIG. 4 is a bottom plan view of the mounting assembly of FIGS. 1-3;

FIG. 5 is a side elevation of the coupler incorporated in the mounting assembly of FIGS. 1-4;

FIG. 13 is an end elevation of the spring clamp retaining band used in the assembly of FIGS. 1-4 and 12;

FIG. 14 is a sectional side elevation of the spring clamp retaining band taken along plane XIV—XIV of FIG. 13;

FIG. 15 is a bottom plan view of the spring clamp retaining band shown in FIGS. 13 and 14;

FIG. 16 is a perspective view of a conventional windshield mounted base member of the type with which the present breakaway assembly is useful;

FIG. 17 is a side elevation, with portions broken away, of a second form the breakaway mounting assembly of the present invention as installed on a base member;

FIG. 18 is a bottom plan view of the mounting assembly of FIG. 17;

FIG. 19 is a sectional elevation of the mounting assembly and base member taken along plane XIX—XIX of FIG. 17;

FIG. 20 is a sectional elevation taken similarly to FIG. 19 but illustrating the assembly of FIGS. 17-19 prior to installation on the base member;

FIG. 21 is a sectional view illustrating a tool and method for mounting the spring clamp retaining band on the coupler shown in FIGS. 17-20; and FIG. 22 is a sectional view similar to FIG. 21 but showing the spring clamp retaining band further expanded and in a subsequent position from that in FIG. 21 immediately prior to mounting on the coupler.

DESCRIPTION OF THE PREFERRED EMBODIMENTS

Figure 6:
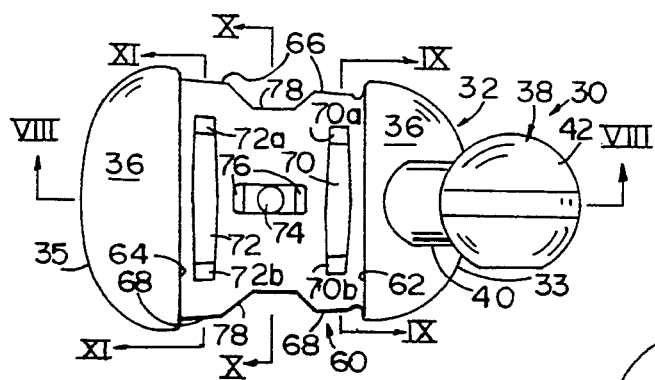
FIG. 6 is a top plan view of the coupler shown in FIG. 5.
Figure 7:
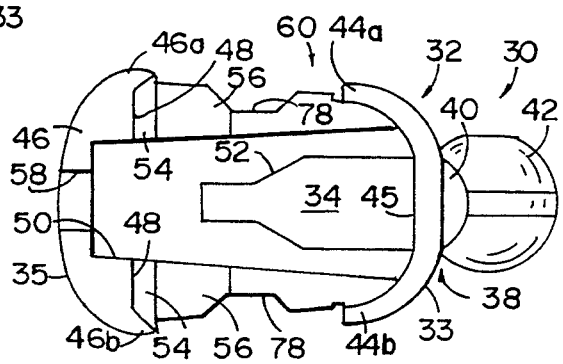
FIG. 7 is a bottom plan view of the coupler shown in FIGS. 5 and 6.

Referring now to the drawings in greater detail, FIGS. 1-4 generally illustrate a first embodiment 10 of the breakaway accessory mounting assembly for vehicles of the present invention. Mounting assembly 10 is adapted for installation on a base 15 secured to the inside surface 12 of a typical rearwardly inclined front windshield W of any of numerous trucks, passenger cars or other vehicles. Assembly 10 typically supports an interior rearview mirror assembly 14 via a pivotable or other support arm 16 extending between the mounting assembly 10 and the rearview mirror assembly 14. As referenced in the following description, the rearview mirror assembly 14 and support arm 16 extend rearwardly into the passenger compartment of the vehicle from the windshield area. Mounting assembly 10 is typically positioned centrally on the windshield above the vehicle instrument panel. The direction to the left and toward windshield W in FIG. 1 is, therefore, the forward direction, while that to the right and toward the passenger compartment is the rearward direction. As will be understood, breakaway mounting assembly 10 could be mounted on other windows or other vehicle panels to support other accessories, such as compasses, interior lights, cellular telephone microphones, radar detectors, or other vehicle accessories, all of which may require release upon impact during an accident or the like.

Breakaway mounting assembly 10 has two components including coupler 30 best seen in FIGS. 5–12, and a resilient, flexible, spring clamp retaining band 85, best seen in FIGS. 13–15. Assembly 10 is adapted for use with a conventional, double tapered, windshield mounted base or button 15 formed from steel and shown in FIGS. 1, 12, 16, 17 and 19. Base 15 includes generally planar, parallel front and rear surfaces 16, 17, top and bottom ends 18, 19 and opposed side surfaces 20, 21. Front surface 16 is adapted to be adhered to the surface 12 of glass windshield W using a suitable adhesive, such as clear polyvinyl butral, available from Monsanto Company, of St. Louis, Mo., U.S.A. The opposite surface 17 is adapted to slidingly receive a surface of coupler 30 as is more fully explained below. In order to allow such sliding installation, base 15 includes a double taper provided by side surfaces 20, 21 converging from end 19 toward top end 18. Side surfaces 20, 21 are also inclined toward front surface 16 as shown best in FIGS. 12 and 19.

As is best seen in FIGS. 5–12, coupler 30 is die cast from zinc or molded from a suitable, resinous polymeric material and includes a slightly tapered body 32 having a base contact or bottom surface 34 adapted to slidingly receive base 15 during installation, an outer, exposed, exterior surface 36 which receives retaining band 85, and a rearview mirror/accessory support 38 including neck 40 and ball member 42.

Figure 8:
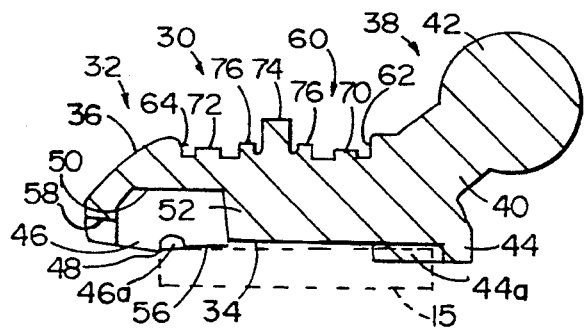
FIG. 8 is a sectional side elevation of the coupler of FIGS. 5-7 taken along plane VIII—VIII of FIG. 6.
Figure 9:
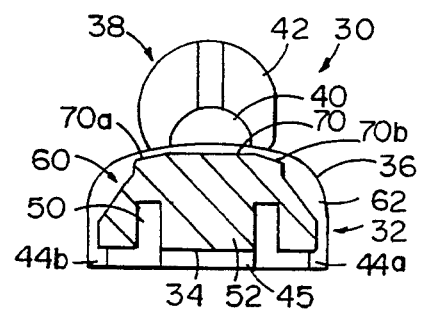
FIG. 9 is a sectional elevation of the coupler taken along plane IX—IX of FIG. 6.
Figure 10:
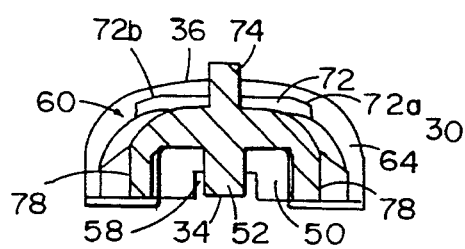
FIG. 10 is a sectional elevation of the coupler taken along plane X—X of FIG. 6.

Projecting from the same side of coupler body 32 on which surface 34 is located are a pair of spaced walls 44, 46 between which base 15 is confined after assembly 10 is installed on the base. Wall 44 follows the rounded shape of the upper end 33 of coupler body 32 adjacent the support 38 and includes lateral portions 44a, 44b which extend partially along the sides of coupler body 32 to laterally confine base 15 as explained hereinafter, and a stop surface 45. Likewise, rear wall 46 includes shoulder 48 and lateral portions 46a, 46b which extend partially along the sides of coupler body 32 and also help confine the base 15 when installed. Between walls 44 and 46 is an elongated recess 50 which reduces the overall weight and material cost of coupler 30. A web or slide support member 52 extends generally longitudinally along the centerline of coupler body 32 in a direction between walls 44, 46, is centrally located within recess 50, and includes slide surface 34 on its exposed, bottom surface. Slide surface 34 is slightly inclined away from the bottom as it progresses toward wall 46 such that only its forward portion adjacent wall 44 actually engages base 15 (FIG. 8). Immediately adjacent shoulder 48 is a groove or recess 54, which allows proper formation of the edge between wall 46 and shoulder 48, and a generally planar support surface 56. A tool insertion slot 58 extends from lower end 35 of coupler body 32 and communicates with recess 50 to allow insertion of a screwdriver blade or other tool to facilitate removal of the assembly 10 from the base 15 when desired after installation. Accordingly, as is best seen in FIGS. 4 and 8, base 15 is adapted to be received between walls 44 and 46 with surface 17 contacting the forward portion of slide surface 34 adjacent wall 44 and support surface 56 and stop shoulder 48. The force of the converging flanges of spring clamp retaining band 85 urge base 15 rearwardly against wall 48 as explained below. Lateral portions 44a, 44b and 46a, 46b on walls 44 and 46 prevent twisting or rotational motion of coupler body 32 on base 15 after installation, as will be apparent from FIG. 4.

As best seen in FIGS. 5, 6 and 8–12, the outer, exposed, exterior surface 36 of coupler body 32 includes a generally transverse recess 60 extending around the entire body which receives spring clamp retaining band 85 therein for generally flush mounting with outer surface 36 as shown in FIGS. 1 and 2. Recess 60 is defined by a pair of generally parallel walls or shoulders 62, 64 which extend from one side of body 32 around the entire exposed surface 36 to the other side. Opposed sides 66, 68 within recess 60 generally converge toward one another as they extend toward the upper end 33 of the coupler. At spaced positions on either side of the center of coupler body 32 and extending generally transverse and across the longitudinal centerline of coupler body 32 are a pair of support ribs 70, 72, each having a pair of support surfaces 70a, 70b and 72a, 72b at their outermost corners. Intermediate ribs 70, 72 is an upstanding, cylindrical fastening post 74 having support surfaces 76 on either side thereof. When spring clamp retaining band 85 is installed on coupler body 32 as explained hereinafter, its inside surface is adapted to engage support surfaces 70a, 70b and 72a, 72b at those four spaced positions for stable support (FIG. 11), while other portions of the inside surface of band 85 engage converging side walls 66, 68. Otherwise, the remaining major portion of the inside surface of band 85 does not touch or engage any other portion of recess 60. However, the edges of spring clamp retaining band 85 are positioned, confined and restrained by walls 62, 64 to prevent twisting, rotation or movement on the coupler body. In addition, inwardly tapered pockets or recesses 78 on either side of recess 60 in coupler body 32 provide angled surfaces for automated aligning equipment used to place and install retaining band 85 on the coupler during manufacture.

As is best seen in FIGS. 13–15, spring clamp retaining band 85 includes a top portion 86, and a pair of opposed, spaced, downwardly extending side walls 88 each of which terminates in an inwardly angled, depending flange 90. Top wall 86 includes a circular aperture 92 while the rear, lower corner of each depending flange 90 is bent slightly outwardly at 94 to aid sliding installation of assembly 10 on base 15 as explained below. The forward and rearward edges 96, 98 of band 85 are generally parallel to one another but may include slightly offset tabs 100 where they are separated from the next adjacent band during manufacture. Due to its extension around the entire exterior of coupler body 32, spring clamp retaining band 85 has a long throw or length which helps produce consistency in both installation and release force in the completed assembly, as well as stable support on base 15. Clamping of the entire coupler inside spring clamp retaining band 85 provides a robust, durable retention of the coupler and any supported accessory or rearview mirror which is highly reliable in use. Inherent tension in band 85 is avoided unlike prior structures where springs are confined within interior cavities.

Figure 11:
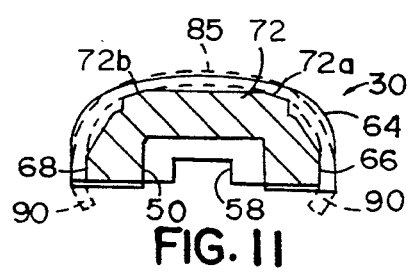
FIG. 11 is a sectional elevation of the coupler taken along plane XI—XI of FIG. 6 and also illustrates the position of the spring clamp retaining band thereon such as during shipment and prior to installation on the vehicle.

Assembly and use of breakaway mounting system 10 will now be understood. As shown in FIGS. 2–4, 6, 8, 10 and 12, spring clamp retaining band 85 may be grasped with an automated or manual spreading tool, such as that shown in FIGS. 21 and 22 and described below, and expanded and placed over coupler body 32 in alignment with recess 60. Aperture 92 is aligned with cylindrical post 74 and the expanded retaining band is moved into position in recess 60 against support surfaces 76 with post 74 projecting through aperture 92. Thereafter, using the backup support of surfaces 76, the terminal end of post 74 is formed over into an enlarged head 74a also causing post 74 to fill aperture 92 and firmly retain band 85 on coupler body 32. When so installed, the inside surface of band 85 engages support surfaces 70a, 70b and 72a, 72b as well as side surfaces 66, 68 as shown in FIG. 11. Flanges 90 of band 85 project below the lower surface of coupler body 32 between walls 44, 46. Specifically, they extend below surfaces 34 and 56 while extending slightly inwardly toward one another as shown in FIGS. 3 and 4. Assembly 10 may then be further assembled with support arm 16 and rearview mirror 14, if desired, followed by shipment of the entire assembly to the vehicle manufacturing site with the retaining band in the position shown in FIG. 11.

Figure 12:
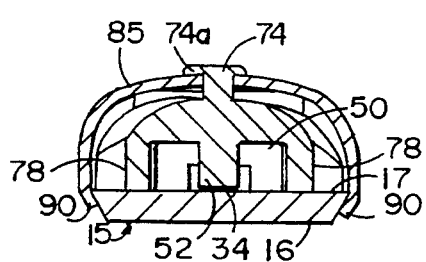
FIG. 12 is a sectional elevation of the mounting assembly taken along plane XII—XII of FIG. 1 when installed on a base secured to a vehicle window.

As will be understood from FIGS. 1 and 8, installation of assembly 10 either with or without accompanying mirror 14 and support arm 16, takes place by aligning end 35 of assembly 10 shown in FIGS. 3 and 4 with the upper, narrower end 18 of base 15 which has previously been installed on a vehicle panel or window such as windshield W. Assembly 10 is then moved downwardly until the upper edge of surface 17 of base 15 engages the upper portion of slide surface 34, while the inside edges of depending flanges 90 engage the inclined side surfaces 20, 21 of base 15 (FIG. 12). Continued movement of assembly 10 downwardly is made with surface 17 engaging slide surface 34 until upper, narrow end 18 of base 15 engages stop shoulder 45 of wall 44, while sides 88 of retaining band 85 are expanded slightly outwardly to provide a gap between those sides and the side walls 66, 68 of coupler body 32 as shown in FIG. 12. As base 15 reaches stop surface 45, the resiliency of flanges 90 pulling coupler body 32 toward surface 17 of base 15 will urge wall 46 over the lower end 19 of base 15 with an audible snap such that surface 17 will rest on support surfaces 56 thereby indicating that installation is complete and base 15 is now confined by spring flanges 90 and walls 44, 46. The preferred installation force is 35 lbs. During use, the force of the converging spring flanges 90 acts to urge surface 17 against surfaces 34, 56 of base 15, and base end 19 against shoulder 48 of wall 46 providing a slight gap between end 18 of base 15 and stop surface 45 as shown in FIG. 8.

When thus installed, assembly 10 will release from base 15 in any one of multiple release directions assuming a sufficiently large impact torque is received. First, an upward rotational torque in the direction of arrow F1 (FIG. 1) having a typical magnitude of at least approximately 7.0 to 7.1 Newton meters will cause detachment of assembly 10 from base 15. Likewise, a lateral rotational impact in the direction of force arrow F2 (FIG. 3) having a typical magnitude of at least 3.5 to 3.8 Newton meters will cause detachment of the assembly from base 15. Further, an oblique rotational force impacting against coupler 30 at approximately 45° as shown by arrow F3 (FIG. 2) like that resulting from an expanding airbag will cause detachment of assembly 10 from base 15 for impact forces typically greater than approximately 4.5 to 4.7 Newton meters. Also, a twisting force in the direction of arrow F4 (FIG. 4) will detach a assembly 10 from base 15. Even forces directed against the mirror 14 from the windshield outwardly into the passenger compartment, such as may be caused by simultaneously expanding driver and front seat passenger airbags can cause release of assembly 10. These force magnitudes are obtained using hardened steel base members 15, and a spring clamp retaining band having a thickness of approximately 0.036 inches of annealed, SAE 1070 spring steel and a Rockwell hardness of 30 kg 61.3–64.8 (RC 42–46). Upward and downward sliding movement and twisting, rotational movement of assembly 10 on base 15 are resisted by walls 44, 46, but will cause release when coupled with force from another direction of sufficient magnitude. As noted above, when spring clamp retaining band 85 is installed by expanding and placing over coupler body 32, the spring member can be caused to "yield" thereby establishing a precisely controllable spring force which provides release at a predictable, consistent impact load from base 15. Prior breakaway systems using other types of spring members have typically not provided any spring "yield" until impact and release. As a result, when the present invention is reinstalled by duplicating the above installation steps, the preset, yielded spring has a predictable, consistent release load even when reinstalled. Thus, assembly 10 stays tightly retained on base 15 even after reinstallation, thereby reducing vibration and image blurring in the supported mirror 14. The creation of spring "yield" during installation places favorable residual stresses in band 85 providing the above results. Further, band 85 is prestressed against support surfaces 70a, 70b and 72a, 72b upon installation and when at rest in the shipped position of FIG. 11. This prestressing decreases installation travel and consequent energy required for installation thereby making the above installation steps easier.

Referring now to FIGS. 17–20, the second embodiment 120 of the breakaway accessory mounting assembly for vehicles is illustrated. Assembly 120 is also adapted for use with a conventional, windshield mounted base 15 as described above and includes two components including a coupler 122 and a spring clamp retaining band 160 fitted therearound in a manner similar to that for assembly 10. The principal differences between assemblies 10 and 120 are the inclusion of a different structure for holding band 160 on coupler 122 during shipping, and a different form of support surface on coupler 122 for engaging spring clamp band 160.

As best seen in FIGS. 17 and 18, coupler 122 includes a base contact surface 124 having a generally U-shaped configuration with a central cavity or recess 126 therein reducing weight and material usage for the coupler. Base contact surface 124 includes slightly converging longitudinal portions 124a, 124b spaced on either side of cavity 126 and a rear portion 124c. Surfaces 124a, 124b extend rearwardly from an upper stop wall 128 at top end 123 of coupler 122. Wall 128 has lateral portions 128a, 128b which confine base 15 therebetween to prevent twist and rotation. At the bottom end 125 of coupler 122 is a stop wall 130 having a stop shoulder 132 which curves forwardly on either side to form lateral retaining portions 132a, 132b. Portions 132a, 132b laterally confine the rear edge of base 15 in a manner similar to that described above for assembly 10. Walls 128, 130, therefore, confine base 15 therebetween when coupler 122 is installed on the base.

The outer, exterior side of coupler 122 extends away from surface 124 and provides the coupler with a slightly tapered overall shape. Projecting from upper end 123 of coupler 122 is a rearview mirror or accessory support 134 including a neck 136 and ball member 138. Formed within the outer surface 140 of coupler 122 is a transverse recess 142 defined by walls 144, 146 which extend from one side surface of coupler 122 to the other across and around the entire coupler body.

Extending generally longitudinally along the centerline of the coupler is a spring clamp retaining band support rib 148 best seen in FIGS. 17 and 19. Rib 148 projects above the surface of recess 142 such that, when installed, the inside surface of spring clamp retaining band 160 contacts the upper surface of rib 148 and the slightly converging side walls 150, 152 of coupler 122 within recess 142 but no other portions of the coupler as shown in FIG. 20.

As is also shown in FIGS. 17–19, side surfaces 150, 152 each include a pair of spaced, inwardly extending recesses 154a, 154b and 156a, 156b which receive retaining tabs from spring clamp retaining band 160 as explained more fully hereinafter. Spring clamp retaining band 160 includes a solid, substantially imperforate top panel 162, and downwardly depending sides 164, 166 which terminate in downwardly depending, resilient, spring flanges 168, 170. Pairs of retaining tabs 172a, 172b and 174a, 174b are spaced adjacent each flange 168, 170. Tabs 172a, 172b, 174a, 174b extend into and engage recesses 154a, 154b and 156a, 156b, respectively. Accordingly, as shown in FIG. 20, when retaining band 160 is expanded and placed over coupler 122 with tool T such that it engages support rib 148, tabs 172a, 172b and 174a, 174b will be received within their respective recesses to hold the spring member on the coupler body. In such position, depending resilient flanges 168, 170 extend below support surface 124 in position to engage the inwardly inclined side surfaces of base 15 (FIG. 19) as assembly 120 is slid downwardly over the top end 18 of base 15 in the manner described above for assembly 10. During such sliding movement, sides 164, 166 of retaining band 160 are expanded slightly outwardly such that a gap exists between side surfaces 150, 152 and the inner surfaces of the retaining band sides after installation on the base 15 as shown in FIG. 19. Assembly 120 will release from base 15 in multiple directions as indicated by force arrows F1, F2, F3 and F4 in the same manner as assembly 10.

As shown in FIGS. 21 and 22, an expanding tool T having opposed jaws is placed around and in engagement with the inner surfaces of depending flanges 168, 170 and used to expand retaining band 160 such that it can be placed over coupler 122 in the manner described above. Such action creates a yield in the spring which establishes a precisely controlled spring force limit providing consistent release loads for assembly 120 just as in assembly 10.

It will be understood that other variations of assembly 10 and 120 may be utilized without deviating from the concept of this invention. Specifically, retaining tabs 172, 174 or retaining post 74 may be eliminated with only the pretension spring force of retaining band 85 or 160 holding that part on the coupler during shipment and prior to assembly with the base 15. However, other fasteners to retain the spring and coupler together can be also be used. In addition, spring bands 85, 160 need not be placed in recesses 60, 142 but could be positioned only by post 74 or tabs 172, 174, or by other ridges or shoulders on outer surfaces 36, 140 of couplers 30, 122 for contact with band edges 96, 98 or 167, 169. Further, bands 85, 160 need not be spaced outwardly by ribs 70, 72 or 148 but could conform to and contact a shaped outer surface of couplers 30, 122.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which exclusive property or privilege is claimed are as follows:

1. A breakaway accessory mounting assembly for vehicles for supporting rearview mirrors or other accessories on a base of the type having a surface for attachment to a surface of a vehicle panel such as a window, and another surface adapted to slidably receive a coupler for supporting a rearview mirror or other accessory thereover, said assembly comprising:

a coupler for slidably engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges which expand away from one another during sliding installment of said coupler on the base, and engage and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler.

2. The assembly of claim 1 including fastening means on one of said coupler and retaining band for securing said retaining band on said coupler.

3. The assembly of claim 2 wherein said fastening means includes at least one tab on said band for engaging said coupler and holding said band on said coupler.

4. The assembly of claim 1 wherein said coupler body includes first and second ends, a first wall at said first end, said first wall being adjacent to and projecting beyond said first surface to provide a stop which engages and positions said assembly on the base during installation.

5. The assembly of claim 4 including a second wall at said second end of said coupler, said second wall being spaced from said first wall and adjacent to and projecting beyond said first surface, and providing a stop for resisting sliding removal of said assembly from the base after installation, said first and second walls defining a base confining area therebetween.

6. The assembly of claim 5 wherein said coupler body includes opposing side surfaces extending between said first and second ends; said first and second walls each including extended portions which extend at least partially along said opposing sides of said coupler body to provide stops which resist twisting movement of said assembly on the base after installation.

7. The assembly of claim 1 wherein said retaining band includes inside and outside surfaces; said coupler body including a support surface contacting said inside surface of said retaining band when said assembly is installed on the base, said support surface being spaced outwardly from adjacent areas of said coupler body whereby major portions of said retaining band are supported in positions spaced from said outer, exterior surface of said coupler body.

8. The assembly of claim 7 wherein said coupler body includes first and second ends and opposing side surfaces extending between said first and second ends; said support surface extending in a direction from said first end toward said second end; said retaining band extending around said coupler body over said support surface from one of said opposing side surfaces to the other of said opposing side surfaces.

9. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including an aperture and a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

fastening means on said coupler for securing said retaining band on said coupler, said fastening means including a headed post on said coupler which extends through said aperture to resist removal of said band.

10. The assembly of claim 9 wherein said coupler body includes a support surface adjacent said post for supporting said band.

11. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

fastening means on said retaining band for securing said band on said coupler including a pair of tabs on said base for engaging a portion of said coupler and holding said band on said coupler; said tabs being located at positions spaced from one another and engaging said coupler on opposite sides thereof.

12. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said coupler body including first and second ends, a first wall at said first end, said first wall being adjacent to and projecting beyond said first surface to provide a stop which engages and positions said assembly on the base during installation, a second wall at said second end of said coupler, said second wall being spaced from said first wall and adjacent to and projecting beyond said first surface, and providing a stop for resisting sliding removal of said assembly from the base after installation, said first and second walls defining a base confining area therebetween;

said coupler body also including opposing side surfaces extending between said first and second ends; said first and second walls each including extending portions which extend at least partially along said opposing sides of said coupler body to provide stops which resist twisting movement of said assembly on the base after installation;

said support for mounting an accessory being at said first end of said coupler body; said depending flanges on said retaining band extending along said side surfaces of said coupler body and between said extended portions of said first and second walls on opposing sides of said coupler body.

13. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said coupler body including first and second ends, a first wall at said first end, said first wall being adjacent to and projecting beyond said first surface to provide a stop which engages and positions said assembly on the base during installation, a second wall at said second end of said coupler, said second wall being spaced from said first wall and adjacent to and projecting beyond said first surface, and providing a stop for resisting sliding removal of said assembly from the base after installation, said first and second walls defining a base confining area therebetween;

said coupler body also including opposing side surfaces extending between said first and second ends; said first and second walls each including extended portions which extend at least partially along said opposing sides of said coupler body to provide stops which resist twisting movement of said assembly on the base after installation;

said second wall also including an opening therethrough for insertion of a tool such as a screwdriver blade for access to and removal of the base from said assembly after installation.

14. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a supporting for mounting an accessory such as a rearview mirror, a first surface for positioning said coupler on the base, and an outer, exterior surface extending away from but generally aligned with said first surface;

a resilient, flexible retaining band extending around said outer coupler body surface, said band including an aperture and a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said coupler body including first and second ends, a first wall at said first end, said first wall being adjacent to and projecting beyond said first surface to provide a stop which engages and positions said assembly said assembly on the base during installation, a second wall at said second end of said coupler, and second wall being spaced from said first wall and adjacent to and projecting beyond said first surface, and providing a stop for resisting sliding removal of said assembly from the base after installation, said first and second walls defining a base confining area therebetween;

said coupler body also including opposing side surfaces extending between said first and second ends; said first and second walls each including extended portions which extend at least partially along said opposing sides of said coupler body to provide stops which resist twisting movement of said assembly on the base after installation, a recess in said first surface between said first and second walls, and an elongated member extending in a direction between said first and second walls within said recess for slidably contacting the base during installation of said assembly on the base.

15. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said coupler body including first and second ends and opposing side surfaces extending between said first and second ends, said support for mounting an accessory being at said first end of said coupler body, said coupler body being tapered such that said opposing side surfaces converge toward said first end; said depending flanges of said retaining band extending along said opposing side surfaces of said coupler body such that they likewise converge toward said first end.

16. The assembly of claim 15 wherein said depending flanges also are inclined toward one another.

17. The assembly of claim 16 wherein said support for mounting an accessory is a neck extending outwardly from said first end of said coupler body, said neck including a ball member thereon for adjustably mounting an accessory thereon.

18. The assembly of claim 16 including a base having generally planar front and back surfaces, first and second ends, and opposing side surfaces, said front surface adapted to be secured to a surface of a vehicle panel such as a window, said opposing side surfaces of said base being inclined toward said front surface and converging from said second end toward said first end; said assembly being mounted on said base with said first base end being adjacent said first end of said coupler body.

19. The assembly of claim 18 wherein said depending flanges of said retaining band are spaced from said opposing sides of said coupler body when said assembly is installed on said base.

20. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said retaining band including inside and outside surfaces; said coupler body including a support surface contacting said inside surface of said retaining band when said assembly is installed on the base, said support surface being spaced outwardly from adjacent areas of said coupler body whereby major portions of said retaining band are supported in positions spaced from said outer, exterior surface of said coupler body;

said coupler body including first and second ends and opposing side surfaces extending between said first and second ends; said outer, exterior surface of said coupler body including a recess extending around said body intermediate said first and second ends from one of said opposing side surfaces to the other of said opposing side surfaces, and recess receiving said retaining band and having a depth sufficient to allow said outer surface of said retaining band to be generally flush with said outer, exterior surface of said coupler body when mounted thereon, said support surface being positioned within said recess.

21. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said retaining band including inside and outside surfaces; said coupler body including a support surface contacting said inside surface of said retaining band when said assembly is installed on the base, said support surface being spaced outwardly from adjacent areas of said coupler body whereby major portions of said retaining band are supported in positions spaced from said outer, exterior surface of said coupler body;

said coupler body including four of said support surfaces for contacting said inside surface of said retaining band, said four support surfaces being spaced from one another to enhance stability of said assembly when installed on the base.

22. The assembly of claim 21 wherein said retaining band includes an aperture; said coupler body including a post positioned generally centrally between said four support surfaces, said post extending through said aperture and having an enlarged head extending beyond said aperture to fasten said retaining band on said coupler body.

23. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having a support for mounting an accessory such as a rearview mirror, a first surface for positioning said coupler on the base, and an outer, exterior surface extending away from but generally aligned with said first surface;

a resilient, flexible retaining band extending around said outer coupler body surface, said band including a pair of resilient, spaced, depending flanges for engaging and releasably retaining said coupler and band on the base when said mounting assembly is installed thereon, said band engaging said outer coupler body surface at a position spaced from and independent of said support whereby when installed on the base, said assembly will be retained on and be releasable from the base independent of the mounting of any rearview mirror or other accessory on said coupler;

said coupler body including first and second ends and opposing side surfaces extending between said first and second ends; said outer, exterior surface of said coupler body including a recess extending around said body intermediate said first and second ends from one of said opposing side surfaces to the other of said opposing side surfaces, said recess receiving said retaining band and having a depth sufficient to allow said outer surface of said retaining band to be generally flush with said outer, exterior surface of said coupler body when mounting thereon.

24. A breakaway accessory mounting assembly for vehicles for supporting rearview mirror or other accessories on a base of the type having a surface for attachment to a surface of a vehicle panel such as a window, and another surface adapted to slidably receive a coupler for supporting a rearview mirror or other accessory thereover, said assembly comprising:

a coupler for slidably engaging the base, said coupler including a body having first and second ends and opposing side surfaces, a support for mounting an accessory such as a rearview mirror, a first surface for positioning said coupler on the base, and an outer, exterior surface extending away from but generally aligned with said first surface;

spring clamp means for releasably retaining said coupler on the base, said spring clamp means extending around said outer exterior surface from one of said opposing sides to the other at a position spaced from said support and having depending spring flanges extending along said opposing side surfaces of said coupler body for engaging opposing sides of the base, said depending flanges being expandable away from one another during sliding installation of said coupler on the base and during release of said coupler from the base; and positioning means on said coupler for locating and positioning said spring clamp means on said coupler body and for resisting movement thereon.

25. The assembly of claim 24 including fastening means on at least one of said coupler and spring clamp means for securing said band on said coupler.

26. The assembly of claim 24 including first and second walls for confining the base therebetween after said assembly is installed on the base, said first and second wall means being adjacent said respective first and second ends of said coupler body, spaced from one another and projecting beyond said first surface.

27. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having first and second ends and opposing side surfaces, a support for mounting an accessory such as a rearview mirror, a first surface for positioning said coupler on the base, and an outer, exterior surface extending away from but generally aligned with said first surface;

spring clamp means for releasably retaining said coupler on the base, said spring clamp means extending around said outer exterior surface from one of said opposing sides to the other at a position spaced from said support and having depending spring flanges extending along said opposing side surfaces of said coupler body for engaging opposing sides of the base; and positioning means on said coupler for locating and positioning said spring clamp means on said coupler body and for resisting movement thereon;

said spring clamp means including inner and outer surfaces; said positioning means including a recess in said outer, exterior surface of said coupler body, said recess extending around said body intermediate said first and second ends from one of said opposing side surfaces to the other, said recess receiving said spring clamp means therein and having a depth sufficient to allow said outer surface of said spring clamp means to be generally flush with said outer, exterior surface of said coupler body when mounted thereon.

28. The assembly of claim 27 wherein said coupler body includes a support surface contacting said inside surface of said spring clamp means when said assembly is installed on the base, said support surface being spaced outwardly from adjacent areas of said coupler body whereby major portions of said spring clamp means are supported in positions spaced from said outer, exterior surface of said coupler body; said support surface being located within said recess.

29. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having first and second ends and opposing side surfaces, a support for mounting an accessory such as a rearview mirror, a first surface for positioning said coupler on the base, and an outer, exterior surface extending away from but generally aligned with said first surface;

spring clamp means for releasably retaining said coupler on the base, said spring clamp means extending around said outer exterior surface from one of said opposing sides to the other at a position spaced from said support and having depending spring flanges extending along said opposing side surfaces of said coupler body for engaging opposing sides of the base; and positioning means on said coupler for locating and positioning said spring clamp means on said coupler body and for resisting movement thereon;

said support for mounting an accessory being located at said first end of said coupler body; said coupler body being tapered such that said opposing side surfaces converge toward said first end; said depending flanges of said spring clamp means extending along said opposing side surfaces of said coupler body such that they likewise converge toward said first end.

30. The assembly of claim 29 wherein said depending flanges also are inclined toward one another.

31. A breakaway accessory mounting assembly for vehicles for supporting rearview mirrors or other accessories on a base of the type having a surface for attachment to a surface of a vehicle panel such as a window, and another surface adapted to slidably receive a coupler for supporting a rearview mirror or other accessory thereover, said assembly comprising:

a coupler for slidably engaging the base, said coupler including a body having first and second ends and opposing side surfaces, a support for mounting an accessory such as a rearview mirror, a first surface for positioning said coupler on the base, and an outer, exterior surface extending away from but generally aligned with said first surface;

spring clamp means for releasably retaining said coupler on the base, said spring clamp means extending around said outer exterior surface of said coupler body from one of said opposing sides to the other at a position spaced from said support and having depending spring flanges extending along said opposing side surfaces of said coupler body for engaging opposing sides of the base said depending flanges being expandable away from one another during sliding installation of said coupler on the base and during release of said coupler from the base; and first and second walls for confining the base therebetween after said assembly is installed on the base, said first and second walls being adjacent said respective first and second ends of said coupler body, spaced from one another, and projecting beyond said first surface.

32. The assembly of claim 31 including positioning means on said coupler for locating and positioning said spring clamp means on said coupler body and for resisting movement thereon.

33. A breakaway accessory mounting assembly for vehicle for supporting rearview mirrors or other accessories on a base adapted for mounting on a surface of a vehicle panel such as a window, said assembly comprising:

a coupler for engaging the base, said coupler including a body having first and second ends and opposing side surfaces, a support for mounting an accessory such as a rearview mirror, a first surface for positioning said coupler on the base, and an outer, exterior surface extending away from but generally aligned with said first surface;

spring clamp means for releasably retaining said coupler on the base, said spring clamp means extending around said outer exterior surface of said coupler body from one of said opposing sides to the other at a position spaced from said support and having depending spring flanges extending along said opposing side surfaces of said coupler body for engaging opposing sides of the base; and first and second walls for confining the base therebetween after said assembly is installed on the base, said first and second walls being adjacent said respective first and second ends of said coupler body, spaced from one another, and projecting beyond said first surface;

positioning means on said coupler for locating and positioning said spring clamp means on said coupler body and for resisting movement thereon;

said spring clamp means including inside and outside surface; said positioning means including a recess in said outer, exterior surface of said coupler body, said recess extending around said body intermediate said first and second ends from one of said opposing side surfaces to the other, said recess receiving said spring clamp means therein and having a depth sufficient to allow said outer surface of said spring clamp means to be generally flush with said outer, exterior surface of said coupler body when mounted thereon.

34. The assembly of claim 33 wherein said coupler body includes a support surface contacting said inside surface of said spring clamp means when said assembly is installed on the base, said support surface being spaced outwardly from adjacent areas of said coupler body whereby major portions of said spring clamp means are supported in positions spaced from said outer, exterior surface of said coupler body; said support surface being located within said recess.

35. A breakaway accessory mounting assembly for vehicles for supporting rearview mirrors or other accessories on a base adapted for mounting on a surface of a vehicle panel such as a window, said assembly comprising:

a coupler for engaging the base, said coupler including a body having first and second ends and opposing side surfaces, a support for mounting an accessory such as a rearview mirror, a first surface for positioning said coupler on the base, and an outer, exterior surface extending away from but generally aligned with said first surface;

spring clamp means for releasably retaining said coupler on the base, said spring clamp means extending around said outer exterior surface of said coupler body from one of said opposing sides to the other at a position spaced from said support and having depending spring flanges extending along said opposing side surfaces of said coupler body for engaging opposing sides of the base; and first and second walls for confining the base therebetween after said assembly is installed on the base, said first and second walls being adjacent said respective first and second ends of said coupler body, spaced from one another, and projecting beyond said first surface;

said support for mounting an accessory being located at said first end of said coupler body; said coupler body being tapered such that said opposing side surfaces converge toward said first end; said depending flanges of said spring clamp means extending along said opposing side surfaces of said coupler body such that they likewise converge toward said first end.

36. The assembly of claim 35 wherein said depending flanges also are inclined toward one another.

* * * * *

UNITED STATES PATENT AND TRADEMARK OFFICE
CERTIFICATE OF CORRECTION

PATENT NO. : 5,377,949
DATED : January 3, 1995
INVENTOR(S) : Theodore M. Haan et al.

It is certified that error appears in the above-indentified patent and that said Letters Patent is hereby corrected as shown below:

Column 9, line 50:
  "Just" should be –just–
Column 13, line 36, claim 14:
  "supporting" should be –support–
Column 13, line 57, claim 14:
  After "assembly" delete –assembly–
Column 15, line 32, claim 20:
  "and recess" should be –said recess–
Column 16, line 50, claim 24:
  "mirror" should be –mirrors–
Column 18, line 63:
  "vehicle" should be –vehicles–
Column 19, line 24:
  "surface" should be –surfaces–

Signed and Sealed this

Third Day of October, 1995

Attest:

BRUCE LEHMAN

Attesting Officer

Commissioner of Patents and Trademarks